(No Model.)
R. T. SMITH.
ART OF PERFORATING MUSIC PAPER FOR AUTOMATIC ORGANS.
No. 259,340. Patented June 13, 1882.
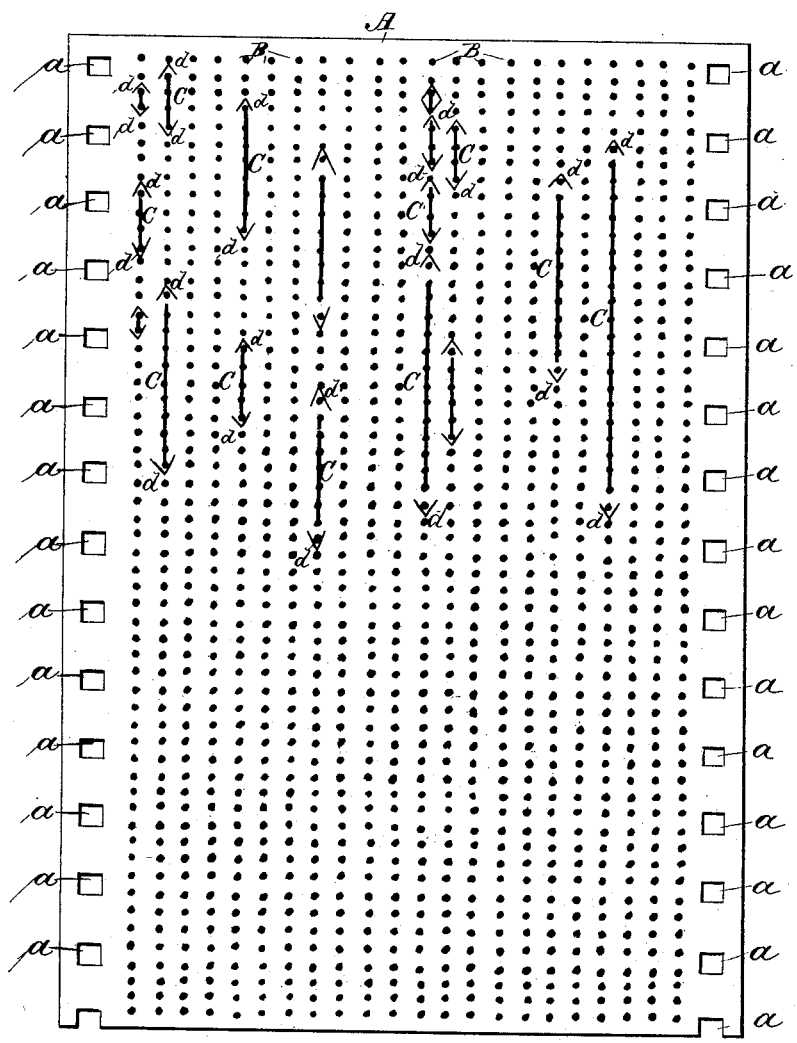

UNITED STATES PATENT OFFICE.

ROSWELL T. SMITH, OF NASHUA, NEW HAMPSHIRE.

ART OF PERFORATING MUSIC-PAPER FOR AUTOMATIC ORGANS.

SPECIFICATION forming part of Letters Patent No. 259,340, dated June 13, 1882.

Application filed February 11, 1881. (No model.)

*To all whom it may concern:*

Be it known that I, ROSWELL TENNEY SMITH, of Nashua, in the county of Hillsborough and State of New Hampshire, have invented certain new and useful Improvements in the Art of Perforating Music-Paper for Automatic Organs, of which the following is a specification.

My invention relates to the machine which was patented to me under date of January 27, 1880, and more particularly to the several improvements upon said machine covered by Letters Patent No. 233,882, dated the 2d day of November, 1880; and it consists in an automatically-prepared blank or form for the stencil-sheet used in said machine or machines, said "blank" being prepared in the manner following, to wit:

In my patent named above I have shown and described a mechanism for preparing the blank stencil-sheet for the "composer" by cutting a rack upon its edges to enable it to engage with the teeth or cogs upon the ends of the stencil-roll, and by making upon the surface of said blank sheet a series of dots or marks, separated by equal intervals and arranged lines exactly transverse to the length of the sheet, by which the composer may be guided in laying off upon the surface the relative length of the several sound-openings.

Referring to the drawing, forming part of this application, A represents the stencil-sheet, which is made of strong heavy paper, and may, if desired, be composed of any other suitable material—as, for example, thin sheet metal, celluloid, parchment, and other equivalent substance. The sheet is prepared by cutting a series of rectangular or other shaped openings, *a*, near the edges of the sheet, to provide what may be termed a "rack," to enable said sheet to engage with the cogs or teeth upon the ends of the stencil-roll of the perforating-machine. The several openings *a* are cut at equal intervals apart, and the distance between them should be just equal to the distance between the teeth upon said stencil-roll shown in my patents above named. Upon the surface of the sheet A, and in the space between the two rows of perforations *a*, is formed a series of dots, B, arranged in lines transverse to the length of the sheet, and the entire surface of the paper is covered by similar series, an equal interval being left between each transverse line of markings and the next succeeding transverse line. By this arrangement of the dotted marks B the whole surface of the sheet is covered by a series or group of markings, arranged in longitudinal lines, and also in lines transverse to said longitudinal lines. In this form the "stencil-sheet blank," as it may be termed, is in condition to be submitted to the music composer, who marks off upon its surface the position and length of the several sound-openings, and then passes the sheet to the "cutter," who, with a mallet and punch, cuts out the spaces marked. When this is completed the stencil-sheet is ready to go on the machine. The space between the adjacent markings on the stencil-blank, measured longitudinally, is just equal to the length of a sound-opening of the smallest size, or to the length of a single cut of the perforating-punches. As it is possible, however, to feed the paper at a rate of speed different from that of the stencil, this distance may be proportional or representative rather than real; but in any case it must be either equal to the step movement of the paper, or it must be so arranged in reference to the feed as to represent the said feed movement accurately. The method of indicating the melody upon the blank stencil-sheet is illustrated in the drawing. The composer, with a pencil, draws a line longitudinally through the series of perforations in the line of which the sound-opening is to be made. This line does not necessarily indicate the length of said opening, which is limited by a mark resembling a hyphen at each end of the line and inclosing the marked point up to and including which the cutting is to be made. This mark is shown in the drawings at *d*, the pencil-lining, which indicates the line upon which the cutting is to be made, being shown at C.

Previous to my invention the stencil-sheets (as well as the organ-paper itself) were produced by first ruling the sheet in transverse lines, at equal intervals, by hand. This work was both laborious and liable to inaccuracies, which affected the harmony. By preparing the stencil-sheet by means of the automatic mechanism shown, described, and claimed in my patent dated November 2, 1880, No. 233,882, I accomplish the same object with perfect accuracy, and with a great saving of time and expense, the rack being cut and the surface marked at the same time. After the melody is perforated in the sheet by hand, in the manner described, it is ready to go on the machine as a pattern from which duplicates may be made in any number.

Instead of cutting the rack in or near the edges of the sheet, a single series of perforations may be formed in some other part—as, for example, near the middle—to engage with a series of teeth on the roll arranged in a corresponding position.

Having thus fully described my invention, what I claim as new, and desire to secure by Letters Patent of the United States, is—

1. As a new article of manufacture, a stencil-blank consisting of a sheet of suitable material having a rack cut therein and having a series of points marked upon its surface, in the manner and for the purpose set forth.

2. The stencil-blank A, having a rack, a, cut near its edges, and provided with a series of marked points, B, arranged in direct transverse lines and at equal intervals longitudinally, substantially as and for the purpose set forth.

3. The method herein described of preparing stencil-sheets for perforating-machines, consisting in laying off the surface of the sheet into equal spaces, indicated by dots or points arranged in the manner set forth, cutting a rack in said sheet, indicating in each series of dots the spaces to be cut by a line and brackets, the former drawn partly through the space and the latter embracing the extreme points or dots to which the cutting is to extend, and finally cutting out the spaces so indicated by a mallet and punch, substantially as and for the purpose set forth.

In testimony whereof I have signed my name to this specification in the presence of two subscribing witnesses.

ROSWELL TENNEY SMITH.

Witnesses:
L. L. TILDEN,
N. A. WHEELER.